United States Patent
Schilit et al.

(10) Patent No.: US 12,265,593 B2
(45) Date of Patent: Apr. 1, 2025

(54) PROVIDING AMBIENT INFORMATION BASED ON LEARNED USER CONTEXT AND INTERACTION, AND ASSOCIATED SYSTEMS AND DEVICES

(71) Applicant: Google LLC, Mountain View, CA (US)

(72) Inventors: William Noah Schilit, Mountain View, CA (US); Paige Pritchard, Oakland, CA (US); Alon Hetzroni, Santa Clara, CA (US)

(73) Assignee: Google LLC, Mountain View, CA (US)

( * ) Notice: Subject to any disclaimer, the term of this patent is extended or adjusted under 35 U.S.C. 154(b) by 957 days.

(21) Appl. No.: 17/144,196

(22) Filed: Jan. 8, 2021

(65) Prior Publication Data

US 2022/0222482 A1 Jul. 14, 2022

(51) Int. Cl.
| | | |
|---|---|---|
| *G06N 3/04* | (2023.01) | |
| *G06F 3/04842* | (2022.01) | |
| *G06F 18/2113* | (2023.01) | |
| *G06F 18/2415* | (2023.01) | |
| *G06F 18/40* | (2023.01) | |
| *G06N 5/04* | (2023.01) | |
| *G06N 7/01* | (2023.01) | |
| *G06N 20/00* | (2019.01) | |

(52) U.S. Cl.
CPC ...... *G06F 18/2113* (2023.01); *G06F 3/04842* (2013.01); *G06F 18/24155* (2023.01); *G06F 18/40* (2023.01); *G06N 5/04* (2013.01); *G06N 7/01* (2023.01); *G06N 20/00* (2019.01)

(58) Field of Classification Search
CPC .................................................. G06F 3/04842
See application file for complete search history.

(56) References Cited

U.S. PATENT DOCUMENTS

| | | | |
|---|---|---|---|
| 9,104,211 B2 | 8/2015 | Fadell | |
| 2017/0228107 A1* | 8/2017 | Bhati | G06F 3/04895 |
| 2017/0329477 A1* | 11/2017 | Sachidanandam | G06F 3/0484 |
| 2018/0314972 A1* | 11/2018 | Swindell | G06N 20/00 |

(Continued)

FOREIGN PATENT DOCUMENTS

WO  WO 2016191737  12/2016

OTHER PUBLICATIONS

Baeza-Yates, Ricardo, et al. "Predicting the next app that you are going to use." Proceedings of the eighth ACM international conference on web search and data mining. 2015. (Year: 2015).*

(Continued)

*Primary Examiner* — Hal Schnee
(74) *Attorney, Agent, or Firm* — Kilpatrick Townsend & Stockton LLP (57) ABSTRACT

Methods, computer readable media, and devices for auto scheduling of ambient information and apps based on learned user context and interaction are described. A method may include recording information corresponding to one or more ambient screens previously displayed to a user, building a probabilistic inference model based at least in part on the recorded information, ranking the one or more ambient screens based at least in part on the probabilistic inference model, selecting a candidate ambient screen from the ranked one or more ambient screens, and displaying the candidate ambient screen during an idle timeslot.

20 Claims, 5 Drawing Sheets

(56) References Cited

U.S. PATENT DOCUMENTS

2022/0210264 A1\* 6/2022 Jung ................ H04M 1/72403

OTHER PUBLICATIONS

Sun, Chen, et al. "AppRush: Using dynamic shortcuts to facilitate application launching on mobile devices." Procedia Computer Science 19 (2013): 445-452. (Year: 2013).\*
Ham, Nathaniel, Amir Dirin, and Teemu H. Laine. "Machine learning and dynamic user interfaces in a context aware nurse application environment." Journal of Ambient Intelligence and Humanized Computing 8 (2017): 259-271. (Year: 2017).\*
International Search Report and Written Opinion dated May 2, 2022 in International Patent Application No. PCT/US2022/011587.
Nest, white paper, "Enhanced Auto-Schedule", Nest Labs, Inc., Nov. 2014, 10 pages.
How Nest thermostats learn—Google Nest Help, https://support.google.com/googlenest/answer/9247510?hl=en&ref_topic=9361874, dated Oct. 26, 2020, 3 pages.
Michael C. Mozer, "The Neural Network House: An Environment that Adapts to its Inhabitants", M. Coen (Ed.), Proceedings of the American Association for Artificial Intelligence Spring Symposium on Intelligent Environments, pp. 110-114, Menlo Park, CA: AAAI Press. 1998.

\* cited by examiner

PROVIDING AMBIENT INFORMATION BASED ON LEARNED USER CONTEXT AND INTERACTION, AND ASSOCIATED SYSTEMS AND DEVICES

BACKGROUND

The use of interactive displays, sometimes referred to as display devices, has become fairly widespread. In general, a display as disclosed herein refers to an electronic device with a display panel capable of presenting information to a user. Such a device may be connected to a network, such as the Internet, and may execute various applications in order to retrieve, process, and/or generate information for presentation to a user. The display may include a user interface to enable a user to interact with the display. For example, the display may be touch enabled and the user may interact with the user interface by touching a display panel of the display (e.g., touching, swiping, flicking, etc.). In another example, the display may be voice enabled and the user may interact with the user interface by speaking.

The nature of information presented by a display may also vary. In particular, information may vary based on an information dimension (i.e., information density or amount of information), a need dimension, and a level of interactivity. For example, a weekly schedule may contain multiple appointments (e.g., high information dimension) while a current weather report may only contain temperature and condition (e.g., low information dimension). Similarly, while a user's schedule may be specific to that user (e.g., low need dimension), the current weather may impact multiple people (e.g., high need dimension). At the same time, even though a user's schedule may be specific to that user, others may be interested in or otherwise impacted by that schedule. That is, the dimensionality may be dependent on context. In another example, a user may utilize a display to play a game (e.g., high interactivity) and later use the display to view a slideshow or video (e.g., low interactivity).

BRIEF SUMMARY

According to an embodiment of the disclosed subject matter, a computer-implemented method for selecting and presenting glanceable information by a computerized information system may include recording information corresponding to one or more ambient screens previously displayed to a user, wherein each ambient screen comprises a presentation of information, building a probabilistic inference model based at least in part on the recorded information, ranking the one or more ambient screens based at least in part on the probabilistic inference model, selecting a candidate ambient screen from the ranked one or more ambient screens, and displaying the candidate ambient screen during an idle timeslot.

In various embodiments, the computerized information system may include a local device that includes a display screen, and the step of displaying the candidate ambient screen may be performed by the local device.

In various embodiments, the steps of ranking the one or more ambient screens and selecting the candidate ambient screen may be performed by a remote computing device that provides the candidate ambient screen to the local device.

In various embodiments, the information corresponding to the one or more ambient screens may include one or more elements selected from the group including: a time of day; a day of week; an ambient screen identifier; a device location; a user like or dislike; an environmental condition; and a user of the device.

In various embodiments, recording information corresponding to one or more ambient screens previously displayed to a user may include receiving an input from the user corresponding to one of the one or more ambient screens previously displayed, the input received during display of the one ambient screen, recording information corresponding to the one ambient screen, and changing a presentation of information based on the received input.

In some embodiments, building the probabilistic inference model may include determining a size of a schedule time slot, determining a frequency of switching within a schedule time slot, determining a boost factor corresponding to a user preference for an ambient screen and a reduce factor corresponding to a user preference against an ambient screen, determining a smoothing factor, and determining one or more weights for smoothing.

In various embodiments, building the probabilistic inference model may include implementing a machine learning algorithm to build the probabilistic inference model. In some embodiments, the machine learning algorithm may be a naïve Bayes classification. In some embodiments, implementing the machine learning algorithm may further include training the machine learning algorithm based on the recorded information corresponding to the one or more previously displayed ambient screens.

In various embodiments, selecting a candidate ambient screen from the ranked one or more ambient screens may further include selecting the candidate ambient screen from the ranked one or more ambient screens based on a weighted sampling of the ranked one or more ambient screens.

In various embodiments, displaying the candidate ambient screen may further include prompting a user for an input selected from the group including an option to skip the candidate ambient screen and an option to select an alternate candidate screen. In some embodiments, displaying the candidate ambient screen may further include recording information corresponding to the candidate ambient screen and in response to receipt of a user input, recording the user input as additional information corresponding to the candidate ambient screen.

According to an embodiment of the disclosed subject matter, a system for selecting and presenting glanceable information is provided that may include a memory configured to store processor instructions and a processor in communication with the memory that is configured to execute the processor instructions to perform recording information corresponding to one or more ambient screens previously displayed to a user, building a probabilistic inference model based at least in part on the recorded information, ranking the one or more ambient screens based at least in part on the probabilistic inference model, selecting a candidate ambient screen from the ranked one or more ambient screens, and displaying the candidate ambient screen during an idle timeslot.

According to an embodiment of the disclosed subject matter, a non-transitory computer-readable medium storing computer code for controlling a processor to cause the processor to perform a method for selecting and presenting glanceable information is provided. According to this embodiment, the computer code may include computer instructions to cause the processor to record information corresponding to one or more ambient screens previously displayed to a user, build a probabilistic inference model based at least in part on the recorded information, rank the one or more ambient screens based at least in part on the probabilistic inference model, select a candidate ambient screen from the ranked one or more ambient screens, and display the candidate ambient screen during an idle timeslot.

Additional features, advantages, and embodiments of the disclosed subject matter may be set forth or apparent from consideration of the following detailed description, drawings, and claims. Moreover, it is to be understood that both the foregoing summary and the following detailed description are illustrative and are intended to provide further explanation without limiting the scope of the claims.

BRIEF DESCRIPTION OF THE DRAWINGS

The accompanying drawings, which are included to provide a further understanding of the disclosed subject matter, are incorporated in and constitute a part of this specification. The drawings also illustrate embodiments of the disclosed subject matter and together with the detailed description serve to explain the principles of embodiments of the disclosed subject matter. No attempt is made to show structural details in more detail than may be necessary for a fundamental understanding of the disclosed subject matter and various ways in which it may be practiced.

DETAILED DESCRIPTION

Various aspects or features of this disclosure are described with reference to the drawings, wherein like reference numerals are used to refer to like elements throughout. In this specification, numerous details are set forth in order to provide a thorough understanding of this disclosure. It should be understood, however, that certain aspects of disclosure can be practiced without these specific details, or with other methods, components, materials, or the like. In other instances, well-known structures and devices are shown in block diagram form to facilitate describing the subject disclosure.

Owners of displays may ask the display for information and sometimes those requests are made repeatedly, every day of the week, each evening, or perhaps each weekend. These requests may be classified as periodic informational needs and may include people's interest in: stocks; traffic conditions; school assignments; sports updates; newly released media; etc. User repetition of these queries is bothersome and moreover users may forget to make these requests.

One type of presented information may be referred to as glanceable or ambient information. Ambient information represents information that may be consumed "at-a-glance" or otherwise during a relatively short period of time, typically requiring little or no interaction from the user other than, in some cases, an initial command to display the information. Ambient information may be, for example, information with low to moderate interactivity and a low to moderate information dimension or information density. Examples of ambient information may include a current/forecasted weather, a to do list, an upcoming appointment, a stock quote, a health status (e.g., how many steps taken), a trending item such as a news headline, a sports score, and/or other information that is easily consumed within a relatively short period of time.

Displays may be well suited to provide ambient information. However, a user currently may be required to repeatedly interact with a display in order to request the same ambient information on a regular basis. That is, in order for a user to receive, for example, a daily weather forecast each morning at 8 AM, the user may need to request the daily weather forecast each morning at 8 AM.

In various implementations of the disclosed subject matter, a display may be able to learn from previous user interactions and subsequently provide ambient information without additional user interactions. For example, a display may learn that a user typically requests a weather forecast each morning at 8 AM and, based on this learning, may present the weather forecast each morning at 8 AM without a user request. Further in this example, the display may learn that the user typically does not request a weather forecast during the weekend. In this case, the display may only present the weather forecast each weekday morning at 8 AM.

More generally, implementations of the disclosed subject matter provide methods, computer readable media, and devices for auto scheduling of ambient information and apps on a display based on learned user context and interaction. Implementations include recording information corresponding to one or more ambient screens previously displayed to a user. In various implementations, each ambient screen may include a presentation of information. An ambient screen may represent, for example, information that is displayed on the entirety and/or some portion of a display of a device and that is consumable at a glance or otherwise in a relatively short period of time. That is, an ambient screen may be displayed on some portion of a display for a short period of time.

Implementations further include building a probabilistic inference model based at least in part on the recorded information and ranking the one or more ambient screens based at least in part on the probabilistic inference model. In addition, implementations include selecting a candidate ambient screen from the ranked one or more ambient screens and displaying the candidate ambient screen during an idle timeslot.

Figure 1A:
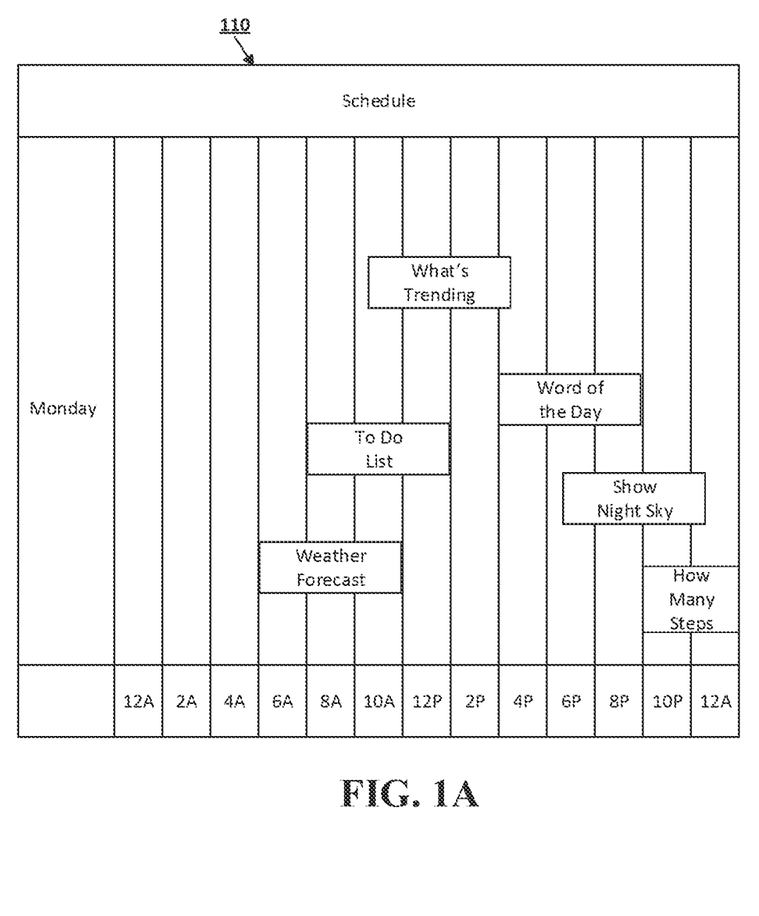
FIG. 1A shows a block diagram of a schedule according to an embodiment of the disclosed subject matter.

FIG. 1A shows a block diagram of a schedule 110. As shown in FIG. 1A, schedule 110 may represent a single day (e.g., Monday) and may be subdivided into time slots. As shown in schedule 110, a user may request and a display may present a weather forecast at 6 AM. In similar fashion, the user may request and the display may present a to do list at 8 AM, a what's trending at 11 AM, a word of the day at 4 PM, a night sky at 7 PM, and a step count at 10 PM. Each type of information may be presented by an associated app, such as a weather forecast app, a to-do list app, and so on. In some cases, a particular app for requested information may be a general or common app, such as a web browser, that operates to retrieve and display the associated information. For example, a weather forecast "app" may be a dedicated app or it may be a web browser configured to obtain and display a weather forecast. Although not shown in FIG. 1A, each day may be represented by a similar schedule with various user requests and various presentations by the display in response.

Figure 1B:
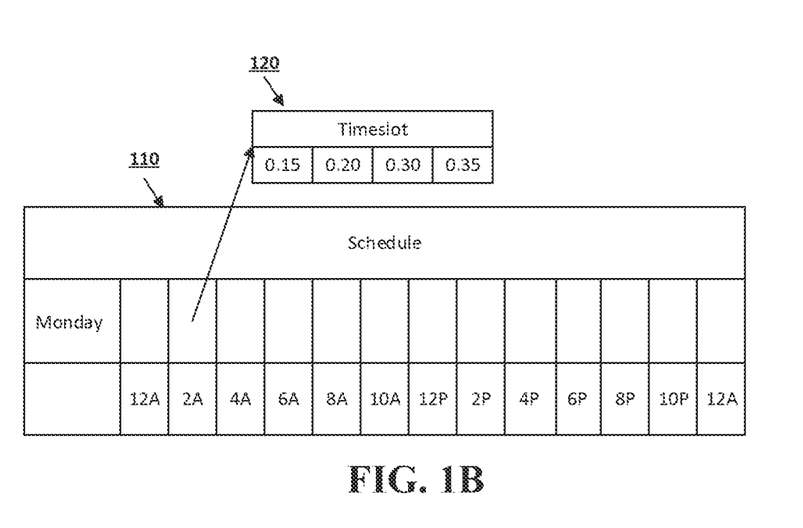
FIGS. 1B-1D show block diagrams of timeslot probabilities, event counts, and event weights for a timeslot according to an embodiment of the disclosed subject matter.
Figure 1C:
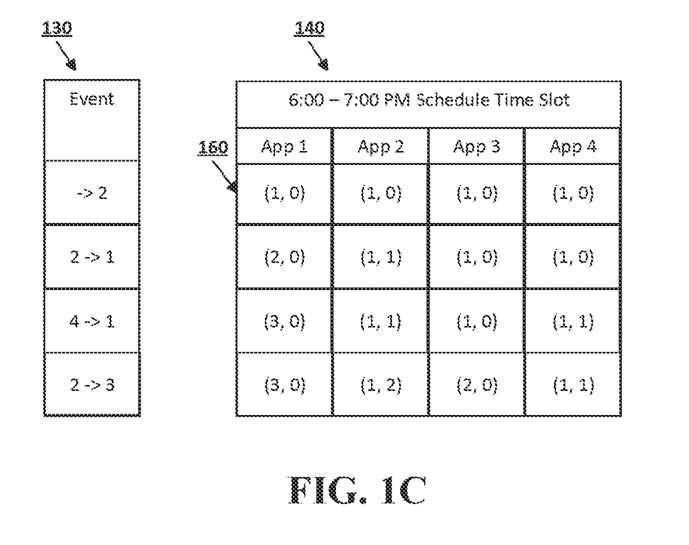
Figure 1D:
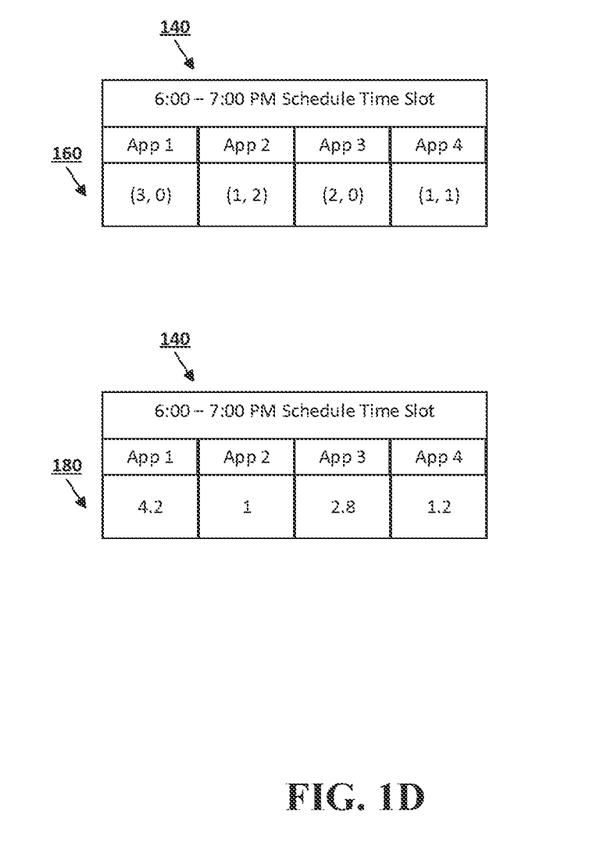

FIGS. 1B-1D show block diagrams of timeslot probabilities, event counts and event weights for a timeslot according to an embodiment of the disclosed subject matter. FIG. 1B shows a block diagram of schedule 110 and timeslot probabilities 120. In contrast to other devices such as thermostats, "do not disturb" phone settings, and the like, a display may select from a number of different applications instead of a single set point or on/off signal. In particular, the different applications may represent, for example, a set of "favorite" applications preferred by a user of the display. In various implementations, the set of favorite applications may include all preferred applications and remain the same for each timeslot. Alternatively, or in addition, the set of favorite applications may include only applications preferred during a timeslot and the set of favorite applications may change for each timeslot.

As shown in FIG. 1B, the set of favorite applications may, for example, include four applications and timeslot probabilities 120 includes the probability that each favorite application may be preferred during the timeslot. For example, application 1 may have a probability of 0.15, application 2 may have a probability of 0.20, application 3 may have a probability of 0.30 and application 4 may have a probability of 0.35.

FIG. 1C shows a block diagram of events 130 and event counts 160 for a timeslot 140. For example, events 130 may start with a presentation of app 2, a transition from app 2 to app 1, a transition from app 4 to app 1, and a transition from app 2 to app 3. Each transition from one app to another app may involve a user interaction, such as a user swiping or otherwise indicating a preference for the other app. Thus, a transition away from one app represents a dislike for the one app and a transition to another app represents a like for the other app. As such, each event count 160 is represented as (x, y) where x is a count of likes and y is a count of dislikes. Although not explicitly shown in FIG. 1C, events 130 may include an event wherein a currently displayed app remains displayed and/or a user interaction indicates a preference for the currently displayed app. That is, as opposed to swiping away from the currently displayed app, the user allows the currently displayed app to remain displayed or otherwise interacts with the display to indicate a preference for the currently displayed app (e.g., clicking a heart, clicking a like icon, etc.).

As shown in FIG. 1C, event counts 160 include an app 1 count of (3, 0) representing 3 likes and 0 dislikes, an app 2 count of (1, 2) representing 1 like and 2 dislikes, an app 3 count of (2, 0) representing 2 likes and 0 dislikes, and an app 4 count of (1, 1) representing 1 like and 1 dislike. In this way, a user preference for various applications may be established for a timeslot, such as timeslot 140.

FIG. 1D shows a block diagram of timeslot 140 and event counts 160 as well as timeslot 140 and weights 180. In various implementations, each like count may have a corresponding boost factor B and each dislike count may have a corresponding reduce factor R. For example, a boost factor may be 1.4 and a reduce factor may be −0.2. In various implementations, an application weight may be determined, for example, by multiplying each like count by a corresponding boost factor and each dislike count by a corresponding reduce factor and then adding the two resulting values together. For example, the application weight for app 1 may be (3*1.4)+(0*−0.2) which equals (4.2)+(0) or 4.2. Similarly, in this example, app 2 may have an application weight of 1, app 3 may have an application weight of 2.8, and app 4 may have an application weight of 1.2.

The application weights 180 may then be utilized to generate a prediction for each of the applications. For example, a prediction may be generated regarding the likelihood that an application may be the most preferred application for a particular period within a timeslot. In various implementations, the prediction may be generated based on a weighted or Monte Carlo sampling of the set of preferred applications. Further in these implementations, a new prediction may be generated corresponding to each period within a timeslot. For example, a 120 minute timeslot may be subdivided into 40 three minute periods. In this example, a new prediction may be generated for each three minute period and a corresponding application based on each prediction may be selected to present information during each three minute period. In another example, there may be m timeslots (e.g., 24 one hour timeslots), k frequency of switching within a time slot (e.g., 5 minutes), boost factor B for likes (e.g., 1.30), reduce factor R for dislikes (e.g., −0.20), smoothing factor s (e.g., 0.4), and weights α, β, and λ for smoothing.

In various implementations, the above described approach for "learning" preferred applications to display information during a timeslot may work well if a number of applications have been used during the timeslot (e.g., the set of preferred applications is larger than 1). However, there may be "empty" timeslots in which a user has not interacted with the display or otherwise has not indicated likes and/or dislikes for one or more applications. In order to address these empty timeslots, a schedule may be smoothed based on neighboring timeslots. For example, a probability for a timeslot may be generated based on the formula $$P'_n = \frac{s}{2}P_{n-1} + (1-s)P_n + \frac{s}{2}P_{n+1} \text{ where } P_{n-1}$$

represents the previous timeslot, $P_n$ represents the current timeslot, and $P_{n+1}$ represents the next timeslot. In other examples, smoothing may be performed based on a generic weekday and/or a generic timeslot. In a further example, smoothing may be performed based on a combination of neighboring timeslots, generic weekday, and generic timeslot. For example $P'_n = \alpha P_n^{neighbors} + \beta P_n^{generic\_slot} + \lambda P_n^{generic\_weekday}$.

Figure 2:
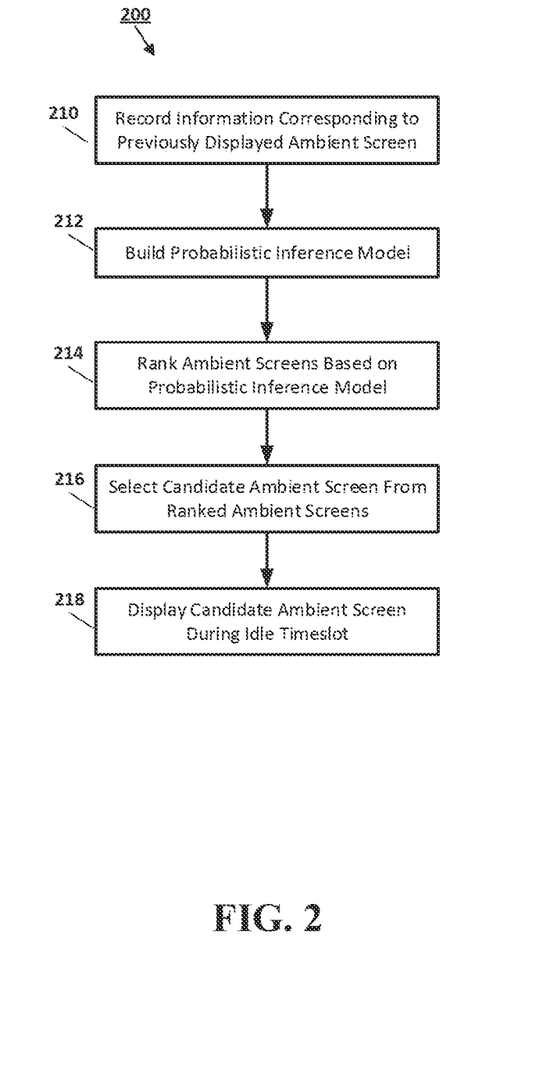
FIG. 2 shows a flow chart of a method for learning and displaying ambient information according to an embodiment of the disclosed subject matter.

FIG. 2 shows a method 200 for auto scheduling of ambient information and apps on a display based on learned user context and interaction according to various implementations of the disclosed subject matter. In various implementations, method 200 may be performed by a processor of a device, such as a display. Alternatively, or in addition, some or all of the steps may be performed in a distributed fashion over a combination of processors of local and/or remote devices. Although the method shows steps in a particular order, this is only for simplicity.

In step 210, information corresponding to previously displayed ambient screens may be recorded. In various implementations, the recorded information may include, for example, information about a request made to prompt display of an ambient screen and information about an application or other process utilized to generate an ambient screen. For example, a user may request a stock quote, either by physically interacting with a display or speaking the request, and the display may display a current value of the stock by running an application that retrieves the stock info from a stock service. The recorded information may also include, for example, a time of day, a day of week, an ambient screen identifier, a device location, a user like or dislike, an environmental condition, a user of the device, and/or other information regarding an ambient screen. Thus, a display may learn not only about what information is requested and how the requested information is delivered, but also about a context for the requested information. In some implementations, the recorded information may include information about a user reaction to the ambient screen. For example, the recorded information may include an indication of whether a user liked and/or disliked the ambient screen. In general, step 210 may be directed to learning by a display.

In step 212, a probabilistic inference model may be built. Such a model includes probabilities that represent the likelihood that information presented as part of an ambient screen may be preferred during a given timeslot. In various implementations, the probabilistic inference model may be built using machine learning. For example, Naïve Bayes may be used to build the model.

In step 214, ambient screens may be ranked based on the probabilistic inference model. In some implementations, ambient screens to be ranked may include, for example, all possible and/or potential ambient screens available to a display. In other implementations, ambient screens to be ranked may include, for example, a set of ambient screens predetermined or otherwise preselected by a user and/or some other interested party. For example, a user, as part of the initial setup and/or ongoing configuration of a display, may be able to identify those ambient screens that will be allowed to display or otherwise present information. Such identification may be, for example, via an "allowed" list and such allowed list may be based on an identification of an application (e.g., app name, app ID, etc.), an identification of an action and/or action type (e.g., verbal request, physical request, request for financial info, request for time/date info, request for personal info, etc.) and/or an identification of a category. In various implementations, ranking of ambient screens may be based on a weighted sampling. For example, a Monte Carlo model may be utilized to rank the ambient screens.

In step 216, a candidate ambient screen may be selected from the ranked ambient screens. For example, the highest ranked ambient screen may be selected as the candidate ambient screen. Alternatively, or in addition, a candidate ambient screen may include some number of the ranked ambient screens. In various implementations, an ambient screen may only utilize a portion of a display panel of a display (e.g., ½ window, ⅓ window, ¼ window, etc.) such that multiple ambient screens may be displayed at the same time and/or displayed in an "overlapping" fashion. In these implementations, candidate ambient screens may include the number of ambient screens to be displayed at the same time. Thus, if 4 ambient screens may be displayed at the same time, then 4 candidate ambient screens may be selected.

In general, steps 212, 214, and 216 are directed to selecting or otherwise determining the next ambient screen(s) to be displayed based on prior learning, such as learning performed as part of step 210.

In step 218, a candidate ambient screen may be displayed during an idle timeslot. For example, a display panel of the display may display the candidate ambient screen at a time when use of the display is not actively being directed by a user. That is, even though a candidate ambient screen may be selected for a given period within a timeslot, the selected candidate ambient screen may not be displayed if the display is otherwise being utilized. Thus, method 200 may be repeatedly performed over a period of time, but step 218 may only result in a displayed ambient screen during an idle timeslot.

In various implementations, the ambient screen displayed as part of step 218 may include a user feedback mechanism. For example, a user may be able to "swipe away" from the ambient screen and such action may be an indication that the user dislikes or otherwise does not prefer that ambient screen. In another example, the user may be able to select a "heart" or some other "like button" and such action may be an indication that the user likes or otherwise prefers the ambient screen. In this way, a user's likes and dislikes regarding ambient screens may be captured. Of note, an ambient screen displayed as part of step 218 during one iteration of method 200 may represent a previously displayed ambient screen for which information is recorded as part of step 210 during a subsequent iteration of method 200.

As described above, methods, computer readable media, and devices for auto scheduling of ambient information and apps on a display based on learned user context and interaction have been disclosed. In particular, a display may be able to "learn" based on current and prior interactions with a user. Based on that learning, the display may be able to "anticipate" future user interactions and provide ambient information without future user interaction.

In situations in which the systems discussed here collect personal information about users, or may make use of personal information, the users may be provided with an opportunity to control whether programs or features collect user information (e.g., information about a user's social network, social actions or activities, profession, a user's preferences, or a user's current location), or to control whether and/or how to receive content from the content server that may be more relevant to the user. In addition, certain data may be treated in one or more ways before it is stored or used, so that personally identifiable information is removed. For example, a user's identity may be treated so that no personally identifiable information can be determined for the user, or a user's geographic location may be generalized where location information is obtained (such as to a city, ZIP code, or state level), so that a particular location of a user cannot be determined. Thus, the user may have control over how information is collected about the user and used by a system as disclosed herein.

Figure 3:
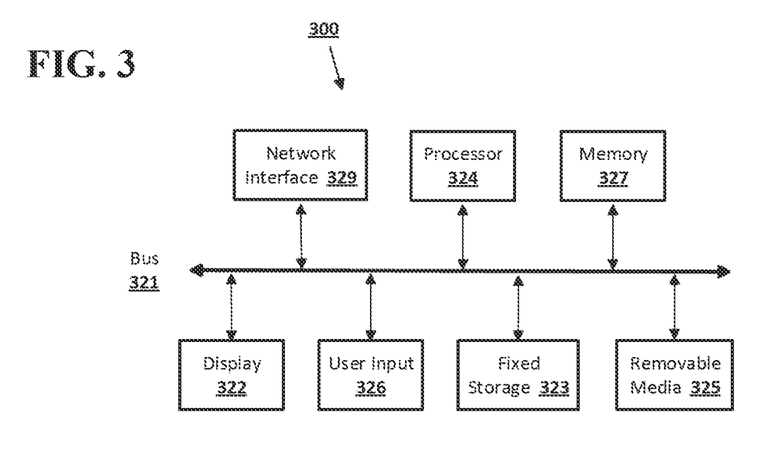
FIG. 3 shows a computing device according to an embodiment of the disclosed subject matter.

Embodiments of the presently disclosed subject matter may be implemented in and used with a variety of component and network architectures. FIG. 3 is an example computing device 300 suitable for implementing embodiments of the presently disclosed subject matter. The device 300 may be, for example, a desktop or laptop computer, a mobile computing device such as a phone, tablet, or the like, or a display as disclosed herein. The device 300 may include a bus 321 which interconnects major components of the computer 300, such as a central processor 324, a memory 327 such as Random Access Memory (RAM), Read Only Memory (ROM), flash RAM, or the like, a user display 322 such as a display screen, a user input interface 326, which may include one or more controllers and associated user input devices such as a keyboard, mouse, touch screen, and the like, a fixed storage 323 such as a hard drive, flash storage, and the like, a removable media component 325 operative to control and receive an optical disk, flash drive, and the like, and a network interface 329 operable to communicate with one or more remote devices via a suitable network connection.

The bus 321 allows data communication between the central processor 324 and one or more memory components, which may include RAM, ROM, and other memory, as previously noted. Typically RAM is the main memory into which an operating system and application programs are loaded. A ROM or flash memory component can contain, among other code, the Basic Input-Output system (BIOS) which controls basic hardware operation such as the interaction with peripheral components. Applications resident with the computer 320 are generally stored on and accessed via a computer readable medium, such as a hard disk drive (e.g., fixed storage 323), an optical drive, floppy disk, or other storage medium.

The fixed storage 323 may be integral with the device 300 or may be separate and accessed through other interfaces. The network interface 329 may provide a direct connection to a remote server via a wired or wireless connection. The network interface 329 may provide such connection using any suitable technique and protocol as will be readily understood by one of skill in the art, including digital cellular telephone, WiFi, Bluetooth®, near-field, and the like. For example, the network interface 329 may allow the computer to communicate with other computers via one or more local, wide-area, or other communication networks, as described in further detail below.

Many other devices or components (not shown) may be connected in a similar manner (e.g., document scanners, digital cameras and so on). Conversely, all of the components shown in FIG. 3 need not be present to practice the present disclosure. The components can be interconnected in different ways from that shown. The operation of a computer such as that shown in FIG. 3 is readily known in the art and is not discussed in detail in this application. Code to implement the present disclosure can be stored in computer-readable storage media such as one or more of the memory 327, fixed storage 323, removable media 325, or on a remote storage location.

Figure 4:
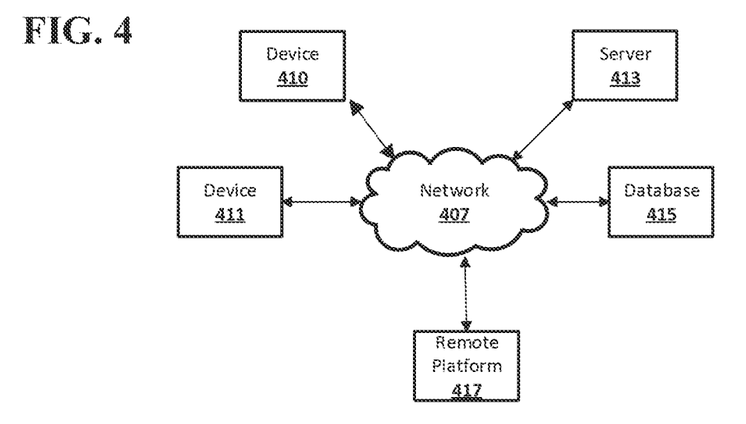
FIG. 4 shows a network configuration according to an embodiment of the disclosed subject matter.

FIG. 4 shows an example network arrangement according to an embodiment of the disclosed subject matter. One or more devices 410, 411, such as local computers, phones, tablet computing devices, and the like may connect to other devices via one or more networks 407. Each device may be a computing device as previously described. The network may be a local network, wide-area network, the Internet, or any other suitable communication network or networks, and may be implemented on any suitable platform including wired and/or wireless networks. The devices may communicate with one or more remote devices, such as servers 413 and/or databases 415. The remote devices may be directly accessible by the devices 410, 411, or one or more other devices may provide intermediary access such as where a server 413 provides access to resources stored in a database 415. The devices 410, 411 also may access remote platforms 417 or services provided by remote platforms 417 such as cloud computing arrangements and services. The remote platform 417 may include one or more servers 413 and/or databases 415.

More generally, various embodiments of the presently disclosed subject matter may include or be embodied in the form of computer-implemented processes and apparatuses for practicing those processes. Embodiments also may be embodied in the form of a computer program product having computer program code containing instructions embodied in non-transitory and/or tangible media, such as floppy diskettes, CD-ROMs, hard drives, USB (universal serial bus) drives, or any other machine readable storage medium, such that when the computer program code is loaded into and executed by a computer, the computer becomes an apparatus for practicing embodiments of the disclosed subject matter.

Embodiments also may be embodied in the form of computer program code, for example, whether stored in a storage medium, loaded into and/or executed by a computer, or transmitted over some transmission medium, such as over electrical wiring or cabling, through fiber optics, or via electromagnetic radiation, such that when the computer program code is loaded into and executed by a computer, the computer becomes an apparatus for practicing embodiments of the disclosed subject matter. When implemented on a general-purpose microprocessor, the computer program code segments configure the microprocessor to create specific logic circuits.

In some configurations, a set of computer-readable instructions stored on a computer-readable storage medium may be implemented by a general-purpose processor, which may transform the general-purpose processor or a device containing the general-purpose processor into a special-purpose device configured to implement or carry out the instructions. Embodiments may be implemented using hardware that may include a processor, such as a general purpose microprocessor and/or an Application Specific Integrated Circuit (ASIC) that embodies all or part of the techniques according to embodiments of the disclosed subject matter in hardware and/or firmware. The processor may be coupled to memory, such as RAM, ROM, flash memory, a hard disk or any other device capable of storing electronic information. The memory may store instructions adapted to be executed by the processor to perform the techniques according to embodiments of the disclosed subject matter.

The foregoing description, for purpose of explanation, has been described with reference to specific embodiments. However, the illustrative discussions above are not intended to be exhaustive or to limit embodiments of the disclosed subject matter to the precise forms disclosed. Many modifications and variations are possible in view of the above teachings. The embodiments were chosen and described in order to explain the principles of embodiments of the disclosed subject matter and their practical applications, to thereby enable others skilled in the art to utilize those embodiments as well as various embodiments with various modifications as may be suited to the particular use contemplated.

The invention claimed is:

1. A computer-implemented method for selecting and presenting glanceable information by a computerized information system, the method comprising:
   recording information corresponding to one or more ambient screens displayed in response to a request of a user, wherein each ambient screen comprises a presentation of information;
   building a model for a defined timeslot based at least in part on the recorded information corresponding to the one or more ambient screens displayed in response to the request of the user;
   ranking the one or more ambient screens based at least in part on the model;
   selecting a candidate ambient screen from the ranked one or more ambient screens; and
   displaying the candidate ambient screen during an idle timeslot, wherein, during the idle timeslot, use of the display is not actively being directed by the user.

2. The method of claim 1, wherein the computerized information system comprises a local device comprising a display screen, and wherein the step of displaying the candidate ambient screen is performed by the local device.

3. The method of claim 2, wherein the steps of ranking the one or more ambient screens and selecting the candidate ambient screen are performed by a remote computing device that provides the candidate ambient screen to the local device.

4. The method of claim 1, wherein the information corresponding to the one or more ambient screens comprises one or more elements selected from the group consisting of:
   a time of day;
   a day of week;
   an ambient screen identifier;
   a device location;
   a user like or dislike;
   an environmental condition; and
   a user of a local device.

5. The method of claim 1, wherein recording information corresponding to one or more ambient screens displayed to a user comprises:
   receiving an input from the user corresponding to one of the one or more ambient screens displayed, the input received during display of the one or more ambient screens;
   recording information corresponding to the one or more ambient screens; and
   changing a presentation of information based on the received input.

6. The method of claim 1, wherein building the model comprises:
   determining a size of a schedule time slot;
   determining a frequency of switching within a schedule time slot;
   determining a boost factor and a reduce factor, wherein the boost factor corresponds to a user preference for an ambient screen and the reduce factor corresponds to a user preference against an ambient screen;
   determining a smoothing factor; and
   determining one or more weights for smoothing.

7. The method of claim 1, wherein building the model comprises:
   implementing a machine learning algorithm to build the model.

8. The method of claim 1, wherein the model is a probabilistic inference model.

9. The method of claim 7, wherein implementing the machine learning algorithm further comprises:
   training the machine learning algorithm based on the recorded information corresponding to the one or more displayed ambient screens.

10. The method of claim 1, wherein selecting the candidate ambient screen from the ranked one or more ambient screens further comprises:
    selecting the candidate ambient screen from the ranked one or more ambient screens based on a weighted sampling of the ranked one or more ambient screens.

11. The method of claim 1, wherein displaying the candidate ambient screen further comprises:
    prompting a user for an input selected from the group consisting of:
      an option to skip the candidate ambient screen; and
      an option to select an alternate candidate screen.

12. The method of claim 11, wherein displaying the candidate ambient screen further comprises:
    recording information corresponding to the candidate ambient screen; and
    in response to receipt of a user input, recording the user input as additional information corresponding to the candidate ambient screen.

13. A system for selecting and presenting glanceable information, the system comprising:
    a memory configured to store processor instructions; and
    a processor in communication with the memory, the processor configured to execute the processor instructions to perform:
      recording information corresponding to one or more ambient screens displayed in response to a request of a user, wherein each ambient screen comprises a presentation of information;
      building a model for a defined timeslot based at least in part on the recorded information corresponding to the one or more ambient screens displayed in response to the request of the user;
      ranking the one or more ambient screens based at least in part on the model;
      selecting a candidate ambient screen from the ranked one or more ambient screens; and
      causing the candidate ambient screen to be displayed during an idle timeslot, wherein, during the idle timeslot, use of a display is not actively being directed by the user.

14. The system of claim 13, wherein recording information corresponding to one or more ambient screens displayed to a user comprises:
    receiving an input from the user corresponding to one of the one or more ambient screens displayed, the input received during display of the one ambient screen;
    recording information corresponding to the one ambient screen; and
    changing a presentation of information based on the received input.

15. The system of claim 13, wherein the processor is configured to execute the processor instructions to perform building the model by implementing a machine learning algorithm to build the model.

16. The system of claim 15, wherein the model is a probabilistic inference model.

17. A non-transitory computer-readable medium storing computer code for controlling a processor to cause the processor to perform a method for selecting and presenting glanceable information, the computer code including computer instructions to cause the processor to:
    record information corresponding to one or more ambient screens displayed in response to a request of a user, wherein each ambient screen comprises a presentation of information;
    build a model for a defined timeslot based at least in part on the recorded information corresponding to the one or more ambient screens displayed in response to the request of the user;
    rank the one or more ambient screens based at least in part on the model;
    select a candidate ambient screen from the ranked one or more ambient screens; and
    cause the candidate ambient screen to be displayed during an idle timeslot, wherein, during the idle timeslot, use of a display is not actively being directed by the user.

18. The non-transitory computer-readable medium of claim 17, wherein the computer code further includes computer instructions to cause the processor to record information corresponding to one or more ambient screens displayed to a user by:
    receiving an input from the user corresponding to one of the one or more ambient screens displayed, the input received during display of the one ambient screen;
    recording information corresponding to the one ambient screen; and changing a presentation of information based on the received input.

19. The non-transitory computer-readable medium of claim 17, wherein the computer code further includes computer instructions to cause the processor to build the model by implementing a machine learning algorithm to build the model.

20. The non-transitory computer-readable medium of claim 19, wherein the model is a probabilistic inference model.

* * * * *